July 5, 1966     H. B. DIAMOND     3,258,974
THREE AXIS FREE SURFACE ACCELEROMETER
Filed Aug. 27, 1963                                  2 Sheets-Sheet 1
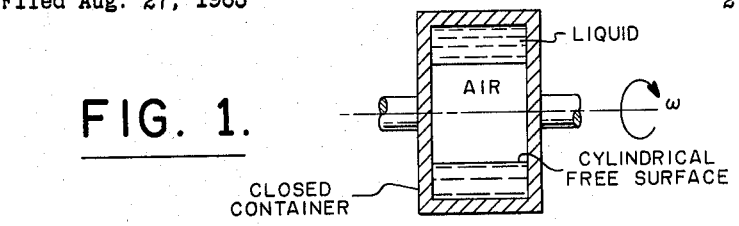
FIG. 1.
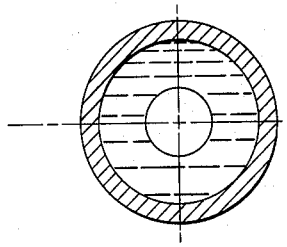 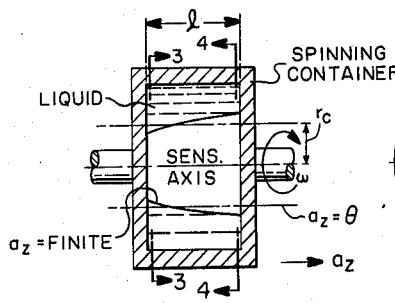 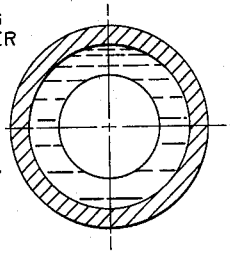
FIG. 3.       FIG. 2.       FIG. 4.
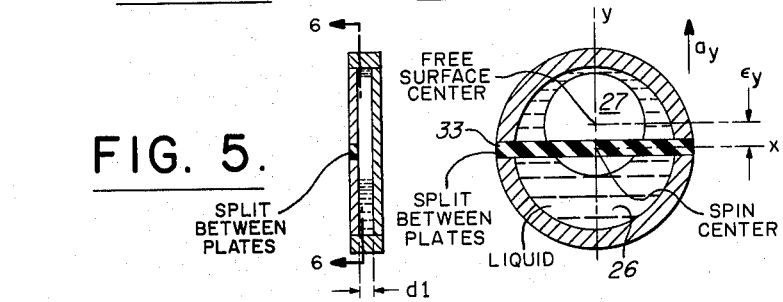
FIG. 5.                             FIG. 6.
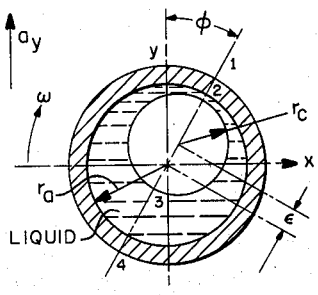           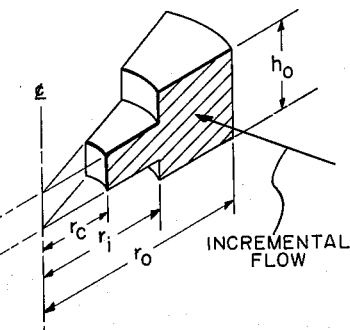
FIG. 8.              FIG. 9.
FIG. 10.
INVENTOR.
HERBERT B. DIAMOND
BY
ATTORNEY

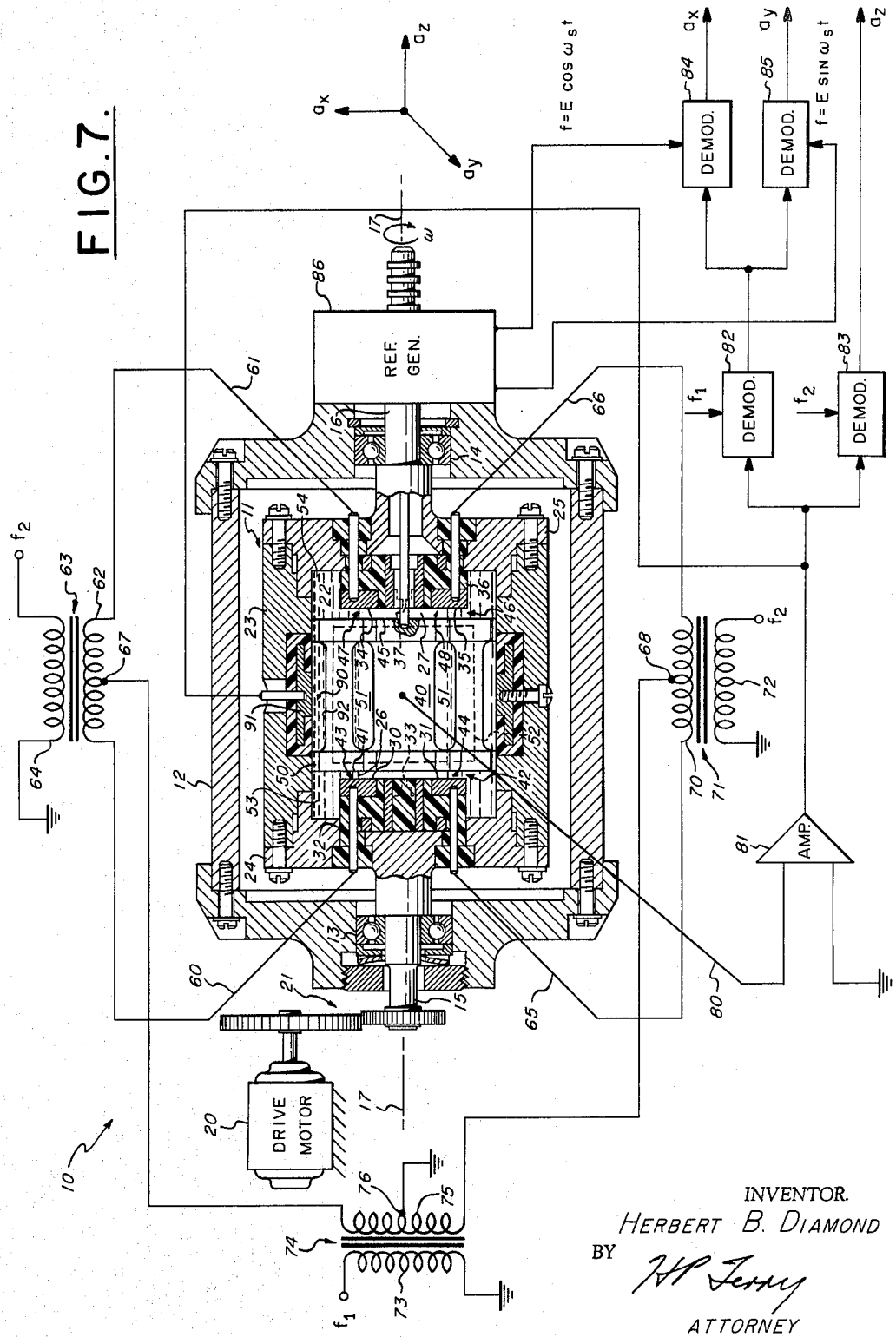

United States Patent Office 3,258,974
Patented July 5, 1966

3,258,974
THREE AXIS FREE SURFACE ACCELEROMETER
Herbert B. Diamond, Valley Stream, N.Y., assignor to Sperry Rand Corporation, Great Neck, N.Y., a corporation of Delaware
Filed Aug. 27, 1963, Ser. No. 304,763
6 Claims. (Cl. 73—516)

The present invention relates to acceleration responsive devices of the type known as linear inertial accelerometers and is an improvement over the accelerometer disclosed in U.S. Patent 3,028,760 issued April 10, 1962, to H. B. Diamond entitled, "Centrifugally Restrained Accelerometer."

The present invention is also an improvement over the free surface accelerometer disclosed in said U.S. patent application S.N. 304,764, entitled, "Free Surface Accelerometer," of W. G. Wing, filed August 27, 1963.

The majority of prior art accelerometers of the inertial type utilize resiliently restrained inertial masses which introduce flexure of mechanical elements that have limited threshold characteristics and unduly long response time. Further, they usually include friction generating means which further limit the capabilities and accuracy of the acceleration sensing apparatus.

Prior art substitutions of a liquid as the inertial mass such as in manometric accelerometers result in accelerometers having relatively non-linear outputs and unduly long response times with comparatively slow recovery thereby rendering them unsuitable for applications where extremely rapid response and high accuracy are mandatory.

It is a primary object of the present invention to provide a fluid acceleration responsive device which provides an accurate measure of the acceleration experienced thereby with respect to three mutually perpendicular axes.

It is an additional object of the present invention to provide a multiple axis acceleration device that is extremely compact by virtue of utilizing superposition theory to minimize the elements involved which utilize discrete characteristics of a free surface fluid to define acceleration components with respect to a plurality of predetermined axes.

It is another object of the present invention to provide an acceleration responsive device which utilizes a free surface fluid that minimizes phase off-set effects of the fluid and compensates for effects due to temperature variations with respect to the pick-off.

The above objects are accomplished by providing a free surface accelerometer with a pick-off having a plurality of capacitors utilizing a common output element as a result of superpositioning substantially different frequency excitation sources. The output signals are demodulated to obtain acceleration signals representative of the acceleration components experienced along predetermined axes. Further, phase off-set caused by viscous shear effects between the capacitive plates of the pick-off is minimized by providing for the majority of fluid flow to be experienced externally of the capacitive pick-off. In addition, errors which would otherwise tend to arise due to pick-off dimensional changes and changes in the dielectric constant of the fluid with temperature fluctuations are compensated by means of a regenerative capacitive loop external to the rotating assembly of the accelerometer.

Referring to the drawings,

FIG. 1 is a schematic cross-sectional view of a cylindrical enclosure containing a free surface high density dielectric fluid in a zero-$g$ field, FIG. 2 is a view of the apparatus of FIG. 1 experiencing an acceleration along the spin axis, FIG. 3 is a view taken along the lines 3—3 of FIG. 2, FIG. 4 is a view taken along the lines 4—4 of FIG. 2, FIG. 5 is a view of a portion of FIG. 1 experiencing an acceleration perpendicular to the spin axis in the vertical direction, FIG. 6 is a view taken along the lines 6—6 of FIG. 5, FIG. 7 is a schematic view partly in section of an accelerometer incorporating the present invention, FIG. 8 is a view of a portion of FIG. 1 showing the orthogonal or phase off-set resulting from an acceleration on one reference axis, FIG. 9 is a perspective view showing a relief area or annulus for reducing the pressure difference to support incremental flow, and FIG. 10 is an electrical schematic wiring diagram showing the accelerometer pick-off temperature compensation circuit by means of a regenerative external capacitive feedback loop.

The present invention is based upon the response of the free surface of a liquid constrained in a spinning enclosure. As shown in FIG. 1, a closed cylinder partially filled with a liquid when spun about its longitudinal axis creates a cylindrical void about the spin axis defined by the inner free surface of the liquid. In the absence of accelerations, the inner fluid boundary defines a circle in any plane through the container normal to the spin axis. Two such planes are formed by the end plates of the container.

As shown in FIG. 2, and as more fully described in said U.S. Patent 3,028,760, when the container is subjected to an acceleration along its spin axis, the inner fluid boundary or free surface takes the form of a frustum of a paraboloid. Thus, with an acceleration to the right along the spin axis $z$ as viewed in FIG. 2, the area defined by the void will be decreased at the left end of the enclosure as shown in FIG. 3 while as shown in FIG. 4 it will be increased on the right end of the enclosure. Thus, the circles lying in the end planes defined by the end plates of the container exhibit an area change proportional to the axially applied acceleration. This may be formulated as follows:

$$A_B - A_A = \frac{2\pi l a_z}{\omega^2} \quad (1)$$

$a_z$ = applied acceleration along the spin axis
$A_B - A_A$ = difference in end-circle areas
$l$ = container length
$\omega$ = container spin rate Reference to Equation 1 above indicates that sensitivity, i.e., the end area change per $g$, is independent of fluid density and therefore does not require temperature control. The specific centrifugal force does act on fluid density to constrain the body to a cylindrical shape, but the axial applied acceleration also acts through the fluid density to cause the parabolic distortion. Since both forces act on the same fluid density parameter, the result is a constant ratio independent of the particular density value although density changes with temperature.

The fluid free-surface is also used in the present invention to detect acceleration components along the two perpendicular axes $x$ and $y$ which are also perpendicular to the spin axis $z$ of the container. To determine this cross-axis sensing it is necessary to consider only an infinitesimal length along the container spin axis $z$ as shown in FIG. 5. If there are no acceleration components in the direction of the $x$ or $y$ axes, the inner circle of the liquid annulus, i.e., the fluid free surface, is concentric with the spin axis of the container as shown in FIG. 1 and the centrifugal acceleration vector through any particle of liquid along the inner circle is normal to the free surface.

If an acceleration is applied along an axis normal to the spin axis, for example, an acceleration $a_y$ in a direction vertically upward along the $y$ axis as shown in FIG. 6, every particle of liquid will experience this same acceleration. Thus, for the liquid along the inner circle, the vector sum of centrifugal and inertial input accelerations will no longer be normal to the free surface at every point around the circle. As shown in FIG. 6, the free surface will therefore be caused to translate along the direction of input acceleration. The magnitude of the translation or eccentricity is just sufficient to insure that the vector sum of the impressed accelerations is once again normal to the free surface.

The eccentricity $\epsilon_x$, in response to an acceleration along the $x$ axis may be expressed as $$\epsilon_x = \frac{a_x}{\omega^2} \quad (2)$$

and similarly with respect to the $y$ axis, $$\epsilon_y = \frac{a_y}{\omega^2} \quad (3)$$

where $a_x$ and $a_y$ are the cross-axis acceleration components.

Sensitivity in this instance, i.e., eccentricity per $g$, is also found to be independent of fluid density. By using a dielectric liquid, a capacitive pick-off can accurately measure the area change of the end plate circles to provide an output signal proportional to the acceleration component acting along the spin axis $z$. By employing split ring capacitor plates as shown in FIGS. 5 and 6, the pick-off also accurately measures the cross-axis translation or eccentricity of the liquid area due to cross-axis acceleration in a manner to be more fully described with respect to FIG. 7.

Referring now to FIG. 7, a three axis free surface accelerometer 10 is shown which operates on the principles explained above. The accelerometer 10 comprises a rotor assembly 11 that is rotatably supported within an outer housing 12 on spaced bearings 13 and 14 by means of oppositely extending shafts 15 and 16. The rotor assembly 11 is spun about its longitudinal or spin axis 17 by means of a drive motor 20 through gearing 21.

The rotor assembly 11 includes a hermetically sealed cylindrical enclosure 22 formed by an aluminum tubular member 23 and two circular aluminum end pieces 24 and 25. The enclosure 22 is partially filled with a liquid 26 which under conditions of rotation distributes itself about the periphery of the enclosure 22 due to centrifugal forces. Preferably, the liquid 26 also has a relatively high dielectric constant with respect to the low density fluid or gas 27 which fills the remainder of the enclosure 22. A suitable combination, for example, has been found to be a #200 Dow Corning silicone having a dielectric constant of 2.63 as the liquid 26 while air having a dielectric constant of 1 is suitable for the gas 27. The end pieces 24 and 25 are connected to the shafts 15 and 16, respectively, about which the assembly 11 rotates.

Semi-circular electrically conductive plates 30 and 31 are mounted on a non-conductive circular projection 32 of the end piece 24 in the manner described with respect to FIGS. 5 and 6, and are spaced with respect to each other by means of a split 33 between the plates 30 and 31. Similarly, semi-circular electrically conductive plates 34 and 35 are mounted on a non-conductive projection 36 of the end piece 25 and are spaced with respect to each other by means of a split 37. The plates 30, 31, 34 and 35 are symmetrically arranged with the plate 30 axially opposed to the plate 34 and the plate 31 opposed to the plate 35 and in axially spaced relation to permit a common output spool member 40 to be disposed therebetween within the enclosure 22. The member 40 is secured to the rotor assembly 11 by means of a shrink fit or other suitable means and generally has the configuration of a hollow H-shaped spool. The spool member 40 is electrically conductive and has a circular end plate 41 that is cooperative with and spaced from the semi-circular plates 30 and 31 to form a variable capacitor 42 having a top portion 43 consisting of the plate 30 and the end plate 41 and a bottom portion 44 consisting of the plate 31 and the end plate 41. Similarly, the other end plate 45 of the spool member 40 is cooperative with the semi-circular plates 34 and 35 to provide another variable capacitor 46. The variable capacitor 46 has a top portion 47 comprising the plate 34 and the end plate 45 and a bottom portion 48 comprising the plate 35 and the end plate 45. The variable capacitors 42 and 46 are arranged such that in the absence of accelerations their capacitive characteristics are identical.

The spool member 40 has a plurality of axially and radially disposed apertures 50 and 51, respectively, symmetrically arranged to permit fluid flow through the spool member 40 in axial and radial directions. Further, the spool member 40 is hollow as indicated by the dotted lines to provide an expansion chamber 52 for the liquid 26 thereby eliminating bellows or other expansion devices.

It will be noted that the distance between the respective plates of the variable capacitors 42 and 46 is kept small in the axial direction while preferably the projection 32 and the end plate 41 as well as the enclosure 22 define a relatively large annulus 53 of liquid 26. Similarly, the enclosure 22, the projection 36 and the end plate 45 define a large annulus 54 of liquid 26 with respect to the relatively small amount contained between the end plate 45 and the plates 34 and 35. During rotation of the rotor assembly 11 this permits the majority of the liquid 26 to be rotated in the annuli 53 and 54 with relatively little being rotated between the plates of the variable capacitors 42 and 46, thereby minimizing phase lag which would otherwise occur in a manner to be more fully explained.

To provide output signals representative of acceleration components with respect to the $x$, $y$ and $z$ axes, as indicated by the mutually orthogonal arrows of FIG. 7, the capacitors 42 and 46 are utilized in capacitive bridge circuits. Thus, the top plates 30 and 34 are connected by means of leads 60 and 61, respectively, to opposite ends of the secondary 62 of a transformer 63 which has its primary 64 connected to a carrier frequency source having a frequency $f_2$. Similarly, the bottom plates 31 and 35 are connected by respective leads 65 and 66 to opposite ends of the secondary 70 of a transformer 71 which has its primary 72 also connected to the carrier frequency source $f_2$. To distinguish between axial accelerations in the direction of the $z$ axis and cross-accelerations in the directions of the $x$ or $y$ axes when using a common output member 40, a substantially different carrier frequency source having a frequency $f_1$ is connected to the primary 73 of another transformer 74 which has the ends of its secondary 75 connected to the center taps 67 and 68 of the secondaries 62 and 70, respectively. The center tap 76 of the secondary 75 is connected to ground potential. The transformers 63, 71, and 74 are shown disposed external to the rotor assembly 11 for ease of explanation. In practice, they may be mounted thereon in order to avoid slip ring connections or alternatively may be disposed fixed to the housing 12 utilizing conventional slip ring techniques.

A common output lead 80 connects the common output member 40 to an isolation amplifier 81. The amplifier 81 is connected to demodulators 82 and 83 which are responsive to the carrier frequencies $f_1$ and $f_2$, respectively. The demodulator 83 provides an output signal representative of the acceleration experienced by the accelerometer 10 along the $z$ or spin axis 17 in a manner to be more fully described. The demodulator 82 is connected to demodulators 84 and 85. A reference generator 86 mounted on the shaft 16 provides a rotor speed reference signal $E \cos \omega_s t$ where the signal frequency $\omega_s$ is representative of rotor shaft speed. This signal is connected to demodulator 84 in order that the latter provides a signal representative of the acceleration experienced along the $x$ axis. The reference generator 86 also provides a rotor speed reference signal $E \sin \omega_s t$ to the demodulator 85 in order that the latter provides a signal representative of the acceleration experienced along the $y$ axis.

The pick-off circuit described immediately above utilizes an additional internal capacitor 90 which acts as a feedback element around the isolation amplifier 81 to primarily provide amplifier gain stability. Thus, the amplifier 81 is connected to a circular plate 91 which is cooperative with the circumference 92 of the spool member 40 to form the capacitor 90.

In operation, as the rotor assembly 11 spins about its axis 17 the liquid 26 by means of viscous drag and centrifugal forces distributes itself evenly about the periphery of the enclosure 22. Under conditions of zero accelaration, the centrifugally restrained inner surface 92 of the liquid 26 assumes the shape of a hollow cylinder with equal liquid areas in the space between the capacitors 42 and 46, as explained schematically with respect to FIG. 1. In response to accelarations along the $z$ or spin axis 17, the circular liquid area will increase in one end with respect to one capacitor and decrease in the other with respect to the other capacitor, as explained with respect to FIGS. 2–4 and in a manner more fully disclosed in said U.S. Patent 3,028,760. The net area change is proportional to the applied axial acceleration. Cross-axis accelerations, i.e., perpendicular to the $z$ axis, tend to eccentrically position the end circles within their spaces between the capacitors 42 and 46 as described with respect to FIGS. 5 and 6.

The pick-off signal from the common output spool member 40 is a measure of the difference in the capacitance established in the capacitors 42 and 46 as a function of a parallel combination of air gap and liquid gap capacitances. Under zero "g" input conditons, i.e., centered circles with respect to the capacitors 42 and 46, the capacitance values established between each excitation plate and the member 40 are nominaly equal excitation plate and the member 40 are nominally equal providing a zero output from the bridge network circuits.

A distortion of the free surface 92 results in a relative liquid with respect to air areas change with a resultant bridge unbalance that produces a carrier voltage output from the output member 40 to the amplifier 81. This carrier voltage output has an amplitude and phase proportional to the instantaneous displacement (or area change) of the circles along the reference axis under consideration and the direction thereof respectively. In order to obtain components of acceleration with respect to the three axes $x$, $y$, and $z$ when utilizing a common output member 40, the signal from the amplifier 81 is first demodulated with reference to each carrier excitation frequency $f_1$ and $f_2$ in demodulators 82 and 83 respectively. Then, with respect to axes $x$ and $y$, the signal must be demodulated with respect to the rotor assembly spin frequency by use of the in-phase and quadrature components of the voltage from the two phase reference generator 86. The output of the demodulator 84 is then a signal having a magnitude and polarity representative of the amount and direction respectively of the acceleration component along the $x$ axis while the output of the modulator 85 has a magnitude and polarity representative of the amount and direction respectively of the acceleration component experienced along the $y$ axis.

The most accurate measure of the cross-axis acceleration components is provided when the translation of the center of the fluid-void boundary is in phase, i.e., aligned with the acceleration vector. As described above, a cross-axis acceleration causes the fluid-void boundary to be displaced from the enclosure spin axis 17. Once this displacement occurs, there is a tendency for every particle of liquid at this boundary to be displaced along a line at right angles to the original translation. This orthogonal displacement is caused by viscous shear arising from the relative velocity between the eccentric boundary and the walls of the enclosure 2. At the center of the boundary, for example, the relative velocity is equivalent to the vector product of the spin rate and the eccentricity.

Assume for purposes of illustration that an input acceleration $a_y$ caused the boundary to translate perfectly along the $y$ reference axis as shown in FIG. 8. The resultant of all the orthogonal shear forces would then be along the other reference axis $x$. Thus, it can be seen that the viscous effect gives rise to a null offset (error) or shift in the location of the sensitive axes. This shift may be referred to as the phase offset angle $\phi$. The magnitude of this error may be expressed as $$\phi = \tan^{-1}\left[\frac{6\frac{\mu}{\rho}(r_o + r_c)}{h^2 \omega r_o \ln r_o/r_c}\right] \quad (4)$$

$\mu$=kinematic viscosity
$r_o$=outer radius of the liquid
$r_c$=inner radius of the fluid circle formed under the condition of zero $g$ along the spin axis
$h$=thickness into the paper as viewed in FIG. 8
ln=natural logarithm The above equation is the expression for phase offset in the direction of viscous shear. The phase offset is proportional to kinematic viscosity, and inversely proportional to spin rate and the square of the gap spacing. The offset is also proportional to a function of the cavity dimensions. For any given application, cavity geometry and spin rate will usually have been determined by the output gain and the maximum size requirement. The kinematic viscosity is established at a low value, but three centistokes (approximately) will be a general minimum for silicone fluids (for example) because other desirable properties such as high flash point or low vapor pressure diminish as $\mu/\rho$ is reduced below this value.

The only other parameter available for manipulation is the gap spacing, $h$, which must necessarily be kept at minimum to obtain high-excitation gap capacitances but making the gap spacing smaller is not conducive to obtaining reduced phase offset.

Referring to FIG. 8, under the conditions of the void being centered and rotation in the clockwise direction shown, the liquid is carried around in a clockwise direction. Suppose now that the void is eccentrically positioned as shown along the $\phi$ direction. The liquid must now experience an increased velocity across the area 1–2 and a reduced velocity across the area 3–4, thereby representing a net flow to the right of the 1–4 axis for these velocity increments. To sustain this net flow, a pressure difference from left to right of the 1–4 axis must exist. It is this pressure difference which causes the phase offset. The phase offset can be reduced by means of the present invention by diminishing the pressure difference required to support any given incremental flow by establishing the areas across 1–2 and 3–4 by means of two thicknesses as shown in FIG. 9. From the center to $r_i$ the spacing is $h_i$, i.e., that value necessary for high pick-off gain of the capacitance pick-off. If the pick-off does not extend beyond $r_i$, the spacing can be increased greatly from $r_i$ to $r_o$. Most of the flow will be delivered by way of this outer volume and the required pressure drop will be low resulting in a vastly reduced phase offset.

Therefore, in accordance with the present invention as shown in FIG. 7, the distance between the semi-circular plates 30 and 31 and the end plate 41 as well as that between the semi-circular plates 34 and 35 and the end plate 45 is kept small in the axial direction to provide good capacitance characteristics. Thus, most of the flow is delivered by way of the large annular volumes 53 and 54 which results in an appreciably reduced phase offset $\phi$.

With a gap spacing of 1/32 inch and operation at 6000 r.p.m., the use of three centistoke silicone fluid results in a phase offset of eight minutes of arc. Since at any temperature there is no reason why the phase offset should not be stable, compensation can easily be effected by geometric adjustment of sensitive axes or by intermixing a small fraction of the "$x$" and "$y$" outputs.

The reduced phase offset is defined by $$\tan \phi = \frac{6\mu/\rho}{h_i^2 \omega r_o} \left[ \frac{(r_i-r_o)^2 + \zeta(r_o-r_i)^2}{(r_i-r_o) + \zeta(r_o-r_i)} \cdot \frac{1}{\ln r_i/r_o + \zeta^2 \ln r_o/r_i} \right] \quad (5)$$

Where $$\zeta = \frac{h_o}{h_i}$$

(see FIG. 8)

This equation shows that, once the gap ratio ($h_o/h_i$) is established at a value of 5.0 or more, the phase offset is virtually independent of inner gap spacing. This can be appreciated by recognizing that the viscous-flow pressure drop is caused by tangential flow, and this flow is delivered mainly by way of the outer gap.

As previously described, the hydraulic sensitivity or scale factor of the free-surface accelerometer 10 is conceptually independent of temperature variations. However, in combination with the capacitive pickoff, the three-axis voltage outputs are subject to certain temperature dependent error sources. These errors relate to pick-off dimensional change and changes in the dielectric constant of the liquid with temperature fluctuations.

The spin-axis output voltage scale factor is given by $$\frac{E_o}{a_z} = \frac{2\pi E_{in}}{\omega^2} \left[ \frac{-1}{h \bar{l}_{FB}} \right] \left[ \frac{K_F - K_A}{K_F} \right] \quad (6)$$

$h$ = excitation gap spacing
$\bar{l}_{FB}$ = equivalent dimensional parameter for internal feedback capacitor; i.e., ratio of area length for feedback element.
$K_F$ = dielectric constant for silicone fluid used
$K_A$ = dielectric constant for air
$E_{in}$ = carrier excitation voltage The cross-axis output voltage scale factors are given by $$\frac{E_o}{a_x} = \frac{E_o}{a_y} = \frac{4E_{in}}{\omega^2} \left[ \frac{r_o}{h \bar{l}_{FB}} \right] \left[ \frac{K_F - K_A}{K_F} \right] \quad (7)$$

Equations 6 and 7 show that the scale factors (including pickoff) relate to the product of two functions: a geometric function and a function of the dielectric constants. Both of these functions will vary with temperature and since both will vary in the same sense for a given temperature change, the external feedback element provides a means for enabling a reversal in sign of the effect of dielectric function change with temperature. The magnitude of the net change can also be adjusted.

By making the percentage change of the dielectric function per unit of temperature change equal and opposite to that of the geometric function, compensation is achieved. Fortunately, the geometric function and dielectric function have similar characteristics nominally linear with temperature. Thus the basic compensation scheme is easily established at any temperature and is effective for the temperature range over which the application of the accelerometer is intended.

The compensation circuit is shown in FIG. 10 which illustrates the previously described pickoff for the accelerometer 10 with an additional external feedback loop 100 around the isolation amplifier 81.

The additional feedback loop 100 consists of a fraction, $K_2$, of the output voltage fed back regeneratively through an external capacitor, $C_x$. It is required only that $C_x$ be either an air or a mica capacitor; i.e., the external capacitor $C_x$ must have a dielectric constant essentially invariant with temperature. Concern need not be given to the presence of the regenerative feedback since the net feedback will always be predominantly negative, i.e., degenerative.

Suppose, for example, the capacitor $C_x$ were an external air-gap capacitor. Then, by applying the standard nodal analysis to the pick-off circuit, a new scale factor equation is obtained. This expression, for all axes, is the same as the uncompensated scale factor equation except for the dielectric term which now becomes $$\frac{K_F - K_A}{K_F - \frac{K_2 K_A}{\bar{l}_{FB}} \bar{l}_x} \quad (8)$$

where $$C_x = K_A \bar{l}_x$$

If $K_2$ were made to $\bar{l}_{FB}/\bar{l}_x$, then the dielectric term would be unity; i.e., it would be completely invariant with temperature. For values of $K_2$ less than $\bar{l}_{FB}/\bar{l}_x$ (uncompensated direction), the change in the dielectric term is negative with temperature. For values of $K_2$ greater than $\bar{l}_{FB}/\bar{l}_x$, the change in the dielectric term is positive with temperature. This demonstrates that the compensation scheme makes possible the desired reversal in sign (sense) of the dielectric function versus temperature. It is evident that the magnitude of the net change can also be set as desired.

For the $z$ or spin axis, the value of $K_2$ is set so that the residual change in the dielectric function is equal and opposite to the change in geometric function. Another value of $K_2$ will accomplish the same result for the $x$ and $y$ axes, thereby implying that two different ratios are required. It will be recalled, however, that the $x$ and $y$ axes are distinguishable from the $z$ axis by virtue of the different carrier excitation frequencies used. These frequencies have been established at, for example, 10 kc.p.s. for the $x$ and $y$ axes and 30 kc.p.s. for the $z$ axis, although any other set sufficiently separated in this general range of frequencies would do as well. Thus, it remains only to insure that $K_2$ be a function of the carrier frequency—its highest value corresponding to the lower frequency. A simple low pass filter 101 of the type shown in FIG. 10 will satisfy these requirements. The low pass filter 101 is preferably designed such that $$(R_1 + R_2)C < \frac{1}{2\pi f_1}$$

$$R_2 C > \frac{1}{2\pi f_2}$$

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In an inertial device having a fluid whose movement is representative of the magnitude and direction of conditions experienced thereby with respect to a plurality of predetermined axes.
    (a) first and second variable pick-off means responsive to said fluid,
    (b) said first and second pick-off means having a common output element,
    (c) first and second excitation sources having first and second substantially different frequencies and connected to said first and second pick-off means whereby said common element provides an output signal having superimposed frequencies,
    (d) first demodulation means responsive to said output signal and said first frequency for demodulating said output signal with respect to said first frequency for providing an acceleration measure with respect to a first predetermined axis, and (e) second demodulation means responsive to said output signal and said second frequency for demodulating said output signal with respect to said second frequency for providing an acceleration measure with respect to a second predetermined axis.

2. In an accelerometer having a fluid whose movement is a discrete function of the magnitude and direction of the acceleration experienced thereby with respect to a plurality of predetermined axes,
- (a) first and second variable capacitor means responsive to said fluid,
- (b) said first and second variable capacitor means having a common output element,
- (c) first and second excitation sources having first and second substantially different frequencies and connected to said first and second variable capacitor means whereby said common output element provides an output signal representative of the superposition of said frequencies,
- (d) first demodulation means responsive to said output signal and said first frequency for demodulating said output signal with respect to said first frequency for providing an acceleration measure with respect to a first predetermined axis, and
- (e) second demodulation means responsive to said output signal and said second frequency for demodulating said output signal with respect to said second frequency for providing an acceleration measure with respect to a second predetermined axis.

3. In an accelerometer having a dielectric fluid whose movement is a discrete function of the magnitude and direction of the accelerations experienced thereby with respect to a plurality of predetermined axes,
- (a) first and second variable capacitive bridge circuit means having first and second variable capacitor means responsive to said fluid,
- (b) said first and second variable capacitor means having a common output element,
- (c) first and second excitation sources having first and second substantially different frequencies,
- (d) said first bridge circuit means further including first and second transformer means having primaries connected to said first excitation sources and secondaries connected to said first and second variable capacitor means, each of said secondaries being center tapped,
- (e) third transformer means having its primary connected to its second excitation source and its secondary connected to said center taps of the secondaries of said first and second transformers, the secondary of said third transformer being center tapped to ground potential,
- (f) said common output element being adapted to provide an output signal respective of the superposition of said first and second frequencies,
- (g) first demodulation means responsive to said output signal and said first frequency for demodulating said output signal with respect to said first frequency for providing an acceleration measure with respect to a first predetermined axis, and
- (h) second demodulation means responsive to said output signal and said second frequency for demodulating said output signal with respect to said second frequency for providing an acceleration measure with respect to a second predetermined axis.

4. In an accelerometer having a dielectric fluid whose movement is a discrete function of the magnitude and direction of the accelerations experienced thereby with respect to a plurality of predetermined axes,
- (a) first and second capacitive plates cooperative with a common output capacitive plate whose capacitance varies in accordance with the movement of said fluid,
- (b) third and fourth capacitive plates cooperative with said common capactitive output plate whose capacitance varies in accordance with the movement of said fluid,
- (c) first and second excitation sources having first and second substantially different frequencies,
- (d) first, second and third transformer means each having center tapped secondaries, the primaries of said first and second transformers being connected to said first excitation sources, the secondary of said first transformer means being connected to said first and second capacitive plates, the secondary of said second transformer means being connected to said third and fourth capacitive plates, the secondary of said third transformer means being connected to the center taps of said first and second transformer means, the center tap of said third transformer means being connected to ground potential,
- (e) first demodulation means connected to said common capacitive output plate and said first excitation source for providing an acceleration signal with respect to a first predetermined axis, and
- (f) second demodulation means connected to said common capacitive output plate and said second excitation source for providing an acceleration signal with respect to a second predetermined axis.

5. In an accelerometer of the character described in claim 4 further including
- (a) means for rotating said fluid around a predetermined axis,
- (b) reference generator means for providing reference signals synchronized with the rotation of said fluid, and
- (c) third and fourth demodulator means connected to said first demodulator means and responsive to said reference signals for providing acceleration signals with respect to predetermined axes.

6. In an accelerometer having a dielectric fluid whose movement is a discrete function of the magnitude and direction of the accelerations experienced thereby.
- (a) first and second variable capacitor means responsive to said dielectric fluid,
- (b) said first and second variable capacitor means having a common output element for providing an output signal,
- (c) amplifier means having an input connected to said common output element and an output,
- (d) third capacitor means connected to said output of said amplifier and said common output element for providing degenerative feedback, and
- (e) regenerative feedback means including fourth capacitor means connected between said output and input of said amplifier means and providing a regenerative signal to compensate for dimensional changes and changes in the dielectric constant of said fluid with temperature.

References Cited by the Examiner
UNITED STATES PATENTS
3,029,644  4/1962  Loveless et al. _____ 73—503 X RICHARD C. QUEISSER, *Primary Examiner.*

JAMES J. GILL, *Examiner.*